United States Patent [19] [11] Patent Number: 5,962,094
Osterkamp et al. [45] Date of Patent: Oct. 5, 1999

[54] MECHANICALLY SEALING CLOSURE FOR RECEPTABLES

[75] Inventors: Doris Osterkamp, Dulmen; Peter Nüssen, Munster., both of Germany

[73] Assignee: PPG Industries Ohio, Inc., Cleveland, Ohio

[21] Appl. No.: 09/011,422

[22] PCT Filed: Aug. 9, 1996

[86] PCT No.: PCT/EP96/03526

§ 371 Date: Apr. 23, 1998

§ 102(e) Date: Apr. 23, 1998

[87] PCT Pub. No.: WO97/06221

PCT Pub. Date: Feb. 20, 1997

[30] Foreign Application Priority Data

Aug. 9, 1995 [DE] Germany ............................ 195 29 230

[51] Int. Cl.$^6$ .................................................. B29D 22/00
[52] U.S. Cl. ...................... 428/35.2; 428/35.3; 428/35.4; 428/35.5; 428/36.6; 428/35.7; 428/35.8; 428/36.7; 428/36.8; 428/36.9; 428/36.91; 428/36.92; 428/355 EN
[58] Field of Search ........................ 428/101, 35.2–35.5, 428/36.6–36.92, 355 EN

[56] References Cited

U.S. PATENT DOCUMENTS

| | | | |
|---|---|---|---|
| 4,807,772 | 2/1989 | Schloss | 215/349 |
| 4,984,703 | 1/1991 | Burzynski | 215/350 |
| 5,026,798 | 6/1991 | Canich | 526/127 |
| 5,055,438 | 10/1991 | Canich | 502/117 |
| 5,133,917 | 7/1992 | Jezic et al. | 264/210.8 |
| 5,695,840 | 12/1997 | Mueller | 428/35.7 |
| 5,709,915 | 1/1998 | Tomic et al. | 428/35.2 |
| 5,723,507 | 3/1998 | Markovich et al. | 521/51 |
| 5,731,053 | 3/1998 | Kuhn et al. | 428/369.2 |
| 5,749,658 | 5/1998 | Kettner | 383/204 |
| 5,769,772 | 6/1998 | Wiley | 493/189 |
| 5,827,163 | 10/1998 | Kettner | 493/211 |
| 5,834,079 | 11/1998 | Blinka et al. | 428/35.7 |
| 5,849,418 | 12/1998 | Hoenig et al. | 428/500 |

FOREIGN PATENT DOCUMENTS

| | | |
|---|---|---|
| 2144054 | 3/1994 | Canada . |
| 0 205 914 | 12/1986 | European Pat. Off. . |
| 0 339 831 | 11/1989 | European Pat. Off. . |
| 1112023 | 5/1968 | United Kingdom . |
| WO 95/00599 | 1/1995 | WIPO . |
| WO 95/05426 | 2/1995 | WIPO . |

Primary Examiner—Marion McCamish
Assistant Examiner—Arti R. Singh
Attorney, Agent, or Firm—Paul S. Chirgott

[57] ABSTRACT

The present invention relates to a closure giving a tight mechanical seal and preferably made from metal or plastic, with an insert on its inner side as a sealing element for containers, in particular for bottles and glassware, where the insert is composed of at least one polyolefin which can be prepared using catalysts selected from the class consisting of the metallocenes.

7 Claims, No Drawings

MECHANICALLY SEALING CLOSURE FOR RECEPTABLES

The present invention relates to a closure giving a tight mechanical seal and preferably made from metal or plastic, with an insert on its inner side as a sealing element for containers, in particular for bottles and glassware.

Container closures must be suitable for simple but nevertheless reliable application to seal the container tightly, no requirement for after-treatment usually being permitted, and the dimensions of the container aperture, as well as the condition in which it has been maintained and its roughness (for example in the case of returnable bottles) may differ greatly. It has therefore long been known that container closures, such as crown caps, can be provided on their inner side facing the container with a resilient sealing element, which, when the closure is applied, is compressed between this and the container and ensures that the seal is tight.

Whereas in earlier times the inserts for crown caps and for bottle screw-closures were produced predominantly from compressed cork, which, if desired, had also been coated with a thin film of plastic or aluminum, for a relatively long time now the sealing element has been produced entirely from synthetic polymer compound. However, suitable polymer compounds for this are only those which are sufficiently permanent and resistant and at the same time have the required resilience.

The material mainly used for this in industry is PVC: polyethylene and mixtures of these materials with vinyl acetate and/or vinyl acetate-ethylene copolymers have also been used.

The production of container closures using such polymer compounds is described, for example, in DE-B-20 33 064 and DE-A-30 21 488.

However, these known polymer compounds still have considerable disadvantages. The use of PVC or of other halogen-containing plastics is giving ever greater difficulties in disposing of the used container closures which find their way into household waste, and in rendering these non-hazardous. The usual incineration of household waste produces acidic gases from halogenated plastics, and the release of these into the environment is damaging. The additions of low-molecular-weight plasticizers (for example phthalates) which are unavoidable for adjustment to achieve the necessary sealing properties are also not free from health hazards, since these plasticizers are to some extent released again from the PVC and can find their way into the human body via the foodstuffs or other consumable items present in the container. For this reason, there is an upper limit placed by appropriate regulations on the proportion of plasticizer in such polymer materials.

The polyethylenes which have hitherto likewise been used have not proven successful as sealing material in particular because account has to be taken of variations in temperature and of damaged container openings. An additional reason for the non-usability of polyethylene was that the tightness of its seal was regarded as inadequate for $CO_2$-containing drinks.

It is an object of the present invention, therefore, to provide a closure giving a tight mechanical seal and preferably made from metal or plastic, with an insert on its inner side as a sealing element for containers, in particular for bottles and glassware, which insert ensures the necessary tightness of sealing, contains no damaging substances, in particular no halogen-containing constituents and no low-molecular-weight ester-group-containing plasticizers. In addition, the insert is to be able to withstand the conditions to which a usual container closure is exposed, in particular pasteurization.

This object is achieved if the insert is composed of at least one polyolefin which can be prepared using catalysts selected from the class consisting of the metallocenes.

The insert according to the invention is preferably composed of from 85 to 15% by weight of at least one polyolefin prepared using catalysts selected from the class consisting of the metallocenes, from 15 to 35% by weight of at least one polypropylene copolymer, from 0 to 25% by weight of at least one synthetic rubber, from 0 to 20% by weight of fillers and from 0 to 5% by weight of other additives.

Particular preference is given to formulations made from 25 to 60% by weight of at least one polyolefin prepared using catalysts selected from the class consisting of the metallocenes, from 20 to 25% by weight of at least one polypropylene copolymer, from 10 to 30% by weight of at least one synthetic rubber, from 10 to 15% by weight of fillers and from 0 to 5% by weight of other additives.

Polyolefins

The polyolefins used according to the invention are produced by known processes from granules of homopolymers of ethylene and propylene, and also copolymers. Examples of these are low-density polyethylene (LDPE), and medium-density (MDPE), high-density (HDPE), linear low-density (LLDPE), and linear very-low-density (VLDPE) polyethylenes, and also the copolymers of ethylene with one or more comonomers selected from the classes consisting of the vinyl esters, vinyl alkyl ethers, unsaturated mono- and dicarboxylic acids, and esters, anhydrides and salts of these.

The polyolefins which can be used according to the invention are obtainable commercially, for example, under the trademarks Escorene®, Lupolen®, Lotader®, Lacqtene®, Orevac®, Lucalen®, Dowlex®, Primacor®, Surlyn®, Admer®, Novatec®, Sclair®, Stamylan®.

Metallocenes

The metallocenes used according to the invention are cyclopentadienyl metal complexes.

Polypropylene Copolymers

The polypropylenes which can be used are random polypropylene copolymers. According to the invention, suitable random polypropylene copolymers are those obtained by random copolymerization of from 90 to 99% by weight, preferably from 93 to 99% by weight, of propylene and from 1 to 10% by weight, preferably from 1 to 7% by weight, based in each case on the total weight of monomers, of comonomers. The random copolymers have a molar mass distribution Mw:Mn in the range from 2 to 10, preferably from 3 to 6, and a melt flow index MFI 230° C./2.16 kg in the range from 1 to 20 g/10 min, preferably in the range from 4 to 15 g/10 min (measured according to DIN 53 735). Such polypropylenes, and also processes for their preparation, are known. They may be prepared, for example, by the polymerization process described in DE-A-37 30 022, using a Ziegler-Natta catalyst system. The propylene copolymers can, for example, be prepared in a gas phase polymerization process at from 20 to 160° C. and at a pressure of from 1 to 100 bar. The molecular weights of the polymers may be controlled by means of well known measures, for example using regulators, such as hydrogen.

Examples of suitable comonomers are $C_2$ and $C_4$–$C_{12}$ α-monoolefins, in particular $C_2$ and $C_4$–$C_6$ α-monoolefins, such as ethene, 1-butene, 4-methyl-1-pentene, 1-hexene, n-1-octene, n-1-decene and n-1-dodecene. Particularly suitable comonomers which may be mentioned are random polypropylene copolymers made from from 1 to 4% by weight of ethylene and from 99 to 96% by weight of propylene, based in each case on the total weight of the formulation of monomers, the random copolymers having a molar mass distribution Mw:Mn in the range from 3 to 6 and a melt flow index MFI 230° C./2.16 kg in the range from 5 to 9 g/10 min (measured according to DIN 53 735). These polypropylene copolymers have a melting range of from about 135 to 155° C. (determined by DSC).

Particular preference is given, furthermore, to random polypropylene copolymers made from from 90 to 97% by weight of propylene, from 2 to 5% by weight of ethylene and from 1 to 6% by weight of 1-butene, based in each case on the total weight of the monomers, and having a molar mass distribution Mw:Mn in the range from 3 to 6 and a melt flow index MFI 230° C./2.16 kg in the range from 4 to 8 g/10 min. Such random polypropylene copolymers have a melting range of from 120 to 140° C. (determined by DSC).

All of the melt flow index MFI values given relate to measurement according to DIN 53 735.

The polypropylene copolymers described are obtainable, for example, under the trade name Novolen® 3225 MCX and Novolen® 3520 LX from BASF AG.

It is, of course, also possible to use mixtures of the polypropylene copolymers mentioned, preferably 1:1 mixtures.

According to the present invention, it is possible to replace the random polypropylene copolymer by polypropylene homopolymer to an extent of up to 50% by weight. In this case, a mixture made from random polypropylene copolymer and polypropylene homopolymer is processed to give a sealing insert. Suitable propylene homopolymers have a molar mass distribution Mw:Mn in the range from 2 to 10, a melt flow index MFI 230° C./2.16 kg in the range from 1 to 20 g/10 min (measured according to DIN 53 735) and an isotacticity index in the range from 80 to 99%, preferably from 90 to 98%.

Preference is given to the use of a mixture made from the random polypropylene copolymer described and a polypropylene homopolymer with a molar mass distribution Mw:Mn in the range from 3 to 6 and a melt flow index MFI 230O C. [sic]/2.16 kg in the range from 4 to 15 g/10 min (measured according to DIN 53 735). The isotacticity index of these polypropylene homopolymers is in the range from 80 to 99%, preferably in the range from 90 to 98%. The homopolymers are known and may, for example, be prepared by the polymerization process described in DE-A-3730022.

Particular preference is given to propylene homopolymers with a molar mass distribution Mw:Mn in the range from 3 to 5 and a melt flow index MFI 2300 C. [sic]/2.16 kg in the range from 10 to 12 g/10 min (DIN 53 735).

Suitable propylene homopolymers are obtainable, for example, under the trade name Novolen® 1100 N and Novolen® 1125 N (BASF AG).

Synthetic Rubbers

Examples of synthetic rubbers are ethylene-propylene copolymers and butyl rubbers.

Fillers

The inserts according to the invention may moreover also contain fillers. Use is preferably made of FDA-approved fillers. Inorganic fillers, for example titanium dioxide, such as Kronos Titan, Rutil R 902 from Du Pont and RC 566 from Sachtleben, barium sulfate and fillers based on silicates, such as talc, kaolin, magnesium aluminum silicates, mica, and the like are generally used. Preference is given to the use of titanium dioxide and fillers of quartz sand type. Other suitable additives are calcium carbonate, diatomaceous earth and calcium stearate.

Other Additives

Low-density polyethylenes of linear structure may also be present in the inserts according to the invention. Examples of these are Escorene®, Lupolenes®, etc.

Other possible additives are those which are usual, for example internal and external lubricants, antiblocking agents, stabilizers, antioxidants, pigments, crystallization aids and the like. Use is made of these additives in the form of powders, beads or directly in the polymer, in the amounts necessary for preparation, processing, fabrication and application. Further details on the amounts usually used and examples of suitable additives are given, for example, in the book Gächter-Müller, Kunststoffadditive [Additives for plastics], Carl-Hanser Verlag.

It is particularly advantageous if the insert contains up to 0.5% by weight, based on the total weight of the mixture, of lubricants, and also up to 0.2% by weight, based on the total weight of the insert, of antiblocking agents, and also, if desired, antioxidants and, if desired, other process stabilizers.

Possible lubricants are in particular primary and secondary fatty amides, such as erucamide or oleamide.

The stabilizers serve primarily for protection from the effects of light and heat. UV stabilizers and heat stabilizers are therefore used in particular. Sterically hindered amines, for example, are used as UV stabilizers. Examples of these are the products obtainable under the trade names Chimasorb® 944 FD and Tinuvin® 622 LD. Sterically hindered phenols are used as heat stabilizers. An example of these is the commercial product Anox®20.

Preferred antioxidants are phenol derivatives.

Preparation Process

For the preparation, a polyolefin is firstly prepared using catalysts selected from the class consisting of the metallocenes. If desired, the polyolefin is mixed with one or more of the other substances mentioned above. It is then extruded and applied as insert on the inner surface of the closure. The coated closures giving a tight mechanical seal are preferably made from metal or plastic and may be used predominantly for closing bottles and glassware.

The invention is described in more detail below with reference to the examples:

Inserts are produced from the following components:

EXAMPLE 1

51.296 parts of high-pressure low-density polyethylene
17 of butyl rubber
5 parts of talc
21 parts of polypropylene
5 parts of polybutene
0.12 parts of fatty amide
0.28 parts of titanium oxide
0.2 parts of sterically hindered phenol
0.01 parts of sterically hindered amine
0.004 parts of carbon black

EXAMPLE 2

29.8 parts of low-density polyethylene of linear structure
24.7 parts of polypropylene
29.8 parts of polyethylene
15 parts of butyl rubber
0.12 parts of fatty amide
0.28 parts of titanium oxide
0.2 parts of sterically hindered phenol
0.01 parts of sterically hindered amine

Preparation Process

The mixtures are extruded and then placed on the inner side of a container closure. After the closure has hardened, it may be pasteurized and used for the closing of containers.

We claim:

1. A closure configured to mechanically seal an opening defined in a container, said closure comprising:
    a. a closure body, and
    b. a sealing element comprising:
        i. from 85 to 15% by weight of at least one polyolefin prepared by using at least one catalyst selected from the group consisting of metallocenes,
        ii. from 15 to 35% by weight of at least one polypropylene copolymer, and
        iii. a synthetic rubber.
2. A closure according to claim 1, wherein the metallocenes comprise cyclopentadienyl metal complexes.
3. A closure according to claim 1, wherein the at least one polyolefin is prepared from at least one of the following: homopolymers of ethylene, homopolymers of propylene, or copolymers of ethylene and propylene.
4. A closure according to claim 1, wherein the sealing element further comprises at least one additional component selected from the group consisting of: a polypropylene copolymer, and a synthetic rubber.
5. A closure according to claim 1, wherein the sealing element further comprises at least one additional component selected from the group consisting of: a low-density polyethylene of linear structure, a stabilizer, a lubricant, a pigment and a filler.
6. A closure according to claim 1, wherein the sealing element comprises:
    a. from 25 to 60% by weight of at least one polyolefin prepared using catalysts selected from the group consisting of metallocenes,
    b. from 20 to 25% by weight of at least one polypropylene copolymer,
    c. from 10 to 30% by weight of at least one synthetic rubber, and
    d. from 10 to 15% by weight of fillers.
7. A process for producing a closure configured to mechanically seal an opening defined in a container, said process comprising:
    a. preparing a closure body having an outer surface and an inner surface,
    b. preparing a sealing element comprising:
        i. from 85 to 15% by weight of at least one polyolefin prepared by using at least one catalyst selected from the group consisting of metallocenes,
        ii. from 15 to 35% by weight of at least one polypropylene copolymer, and
        iii. a synthetic rubber, and
    c. inserting the sealing element on the inner surface of the closure body.

* * * * *